United States Patent
Zamer (10) Patent No.: US 10,713,695 B2
(45) Date of Patent: Jul. 14, 2020

(54) VOICE AND CONTEXT RECOGNITION FOR BILL CREATION

(71) Applicant: PAYPAL, INC., San Jose, CA (US)

(72) Inventor: Kamal Zamer, Austin, TX (US)

(73) Assignee: PAYPAL, INC., San Jose, CA (US)

(*) Notice: Subject to any disclaimer, the term of this patent is extended or adjusted under 35 U.S.C. 154(b) by 0 days.

(21) Appl. No.: 15/495,495

(22) Filed: Apr. 24, 2017

(65) Prior Publication Data

US 2017/0372386 A1   Dec. 28, 2017

Related U.S. Application Data

(63) Continuation of application No. 14/292,485, filed on May 30, 2014, now Pat. No. 9,633,383.

(51) Int. Cl.
  *G06Q 30/04* (2012.01)
  *G06Q 20/14* (2012.01)
  *G06Q 20/32* (2012.01)

(52) U.S. Cl.
  CPC .......... *G06Q 30/04* (2013.01); *G06Q 20/145* (2013.01); *G06Q 20/32* (2013.01)

(58) Field of Classification Search
  None
  See application file for complete search history.

(56) References Cited

U.S. PATENT DOCUMENTS

| | | | | |
|---|---|---|---|---|
| 7,110,963 B2* | 9/2006 | Negreiro | ................ | G06K 17/00 704/275 |
| 7,203,652 B1* | 4/2007 | Heck | ....................... | G10L 15/32 704/231 |
| 7,457,767 B1* | 11/2008 | Dunsmore | ........... | G06Q 20/102 705/17 |
| 8,498,900 B1* | 7/2013 | Spirin | .................... | G06Q 50/00 340/286.09 |
| 9,877,188 B1* | 1/2018 | Jain | ....................... | H04W 12/06 |
| 2004/0143512 A1* | 7/2004 | Sturr, Jr. | ................ | G06Q 20/20 705/26.8 |
| 2006/0076397 A1* | 4/2006 | Langos | ................ | G06Q 10/087 235/375 |
| 2012/0330653 A1* | 12/2012 | Lissek | ................... | H04M 1/035 704/226 |
| 2013/0041824 A1* | 2/2013 | Gupta | ..................... | G06Q 20/14 705/44 |
| 2014/0139866 A1* | 5/2014 | Balar | ........................ | B41J 3/36 358/1.15 |

(Continued)

OTHER PUBLICATIONS

Bishop, Todd. "No Joke: Google Wants a Patent on Splitting the Restaurant Bill." GeekWire, Oct. 4, 2013, www.geekwire.com/2013/joke-google-seeks-patent-splitting-restaurant-bills/. (Year: 2013).*

*Primary Examiner* — Kito R Robinson
*Assistant Examiner* — Shacole C Tibljas
(74) *Attorney, Agent, or Firm* — Haynes and Boone, LLP (57) ABSTRACT

Methods and systems for facilitating payment of a bill are described. The methods use voice and context recognition to create an inventory of items for a specific user. When it is time to split the bill among a group at a table, each user is apportioned their share of the bill based on their inventory so that each user pays for what they ordered. The users may decide to split the bill differently, such as equally among themselves.

20 Claims, 3 Drawing Sheets

(56) References Cited

U.S. PATENT DOCUMENTS

| | | | |
|---|---|---|---|
| 2014/0192795 A1* | 7/2014 | Balar | H04L 12/12 |
| | | | 370/338 |
| 2014/0279098 A1* | 9/2014 | Ham | G06Q 20/20 |
| | | | 705/16 |
| 2015/0046320 A1* | 2/2015 | Baldwin | G06Q 50/12 |
| | | | 705/40 |
| 2015/0134441 A1* | 5/2015 | Balar | G06Q 20/20 |
| | | | 705/14.38 |
| 2015/0206122 A1 | 7/2015 | Elliott et al. | |

* cited by examiner

VOICE AND CONTEXT RECOGNITION FOR BILL CREATION

CROSS REFERENCED TO RELATED APPLICATIONS

This continuation patent application claims priority to and the benefit of U.S. patent application Ser. No. 14/292,485, filed May 30, 2014, and will issue as U.S. Pat. No. 9,633,383 on Apr. 25, 2017, the contents of which are incorporated by reference in its entirety.

BACKGROUND

Field of the Invention

The present invention generally relates to facilitating payment of a bill, such as a bill at a restaurant.

Related Art

Many service businesses, including restaurants, entice customers with guarantees of prompt service. Any delays in taking and filling the customer order results in degradation of service and a loss of business. These delays can be caused, for example, by an incorrect order or by requests to split a bill.

When a plurality of persons dine at a restaurant, for example, and split the total bill, it has been the general practice to declare their meals for payment and then for the server to calculate and charge their shares for the respective menu items. This request can be tedious and time consuming for the server. Especially in larger parties, the party may wish to receive separate bills to properly split the check. Thus, a need exists for a simpler way to split the bill.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The systems and methods described herein provide a faster and more efficient way for a bill to be split among a group. The present disclosure uses voice and context recognition to create an inventory of items for a specific user. This information can then be used to split the bill for all users at a table.

A group of users are seated at a table in a restaurant and each user provides their order by saying menu items out loud. A waiter device and the mobile devices of the users capture each voice order. A service provider receives the voice order, each voice order is associated with a specific user, and an inventory of items ordered by the specific user is created. When the group of users are ready to pay the bill, the waiter device can transmit the total bill to each of the users at the table. The service provider then splits the bill according to the inventory of items ordered by each user so that each user can pay only for what they ordered.

The users at the table, however, may decide to split the bill differently. For example, the users may specify what portions of the bill they want to pay, or the users may agree to split the bill equally. In some embodiments, the service provider identifies who among the people in the group the bill should go to. In other embodiments, the service provider identifies subgroups within the group and combines the costs of members in the subgroup on one bill.

Figure 1:
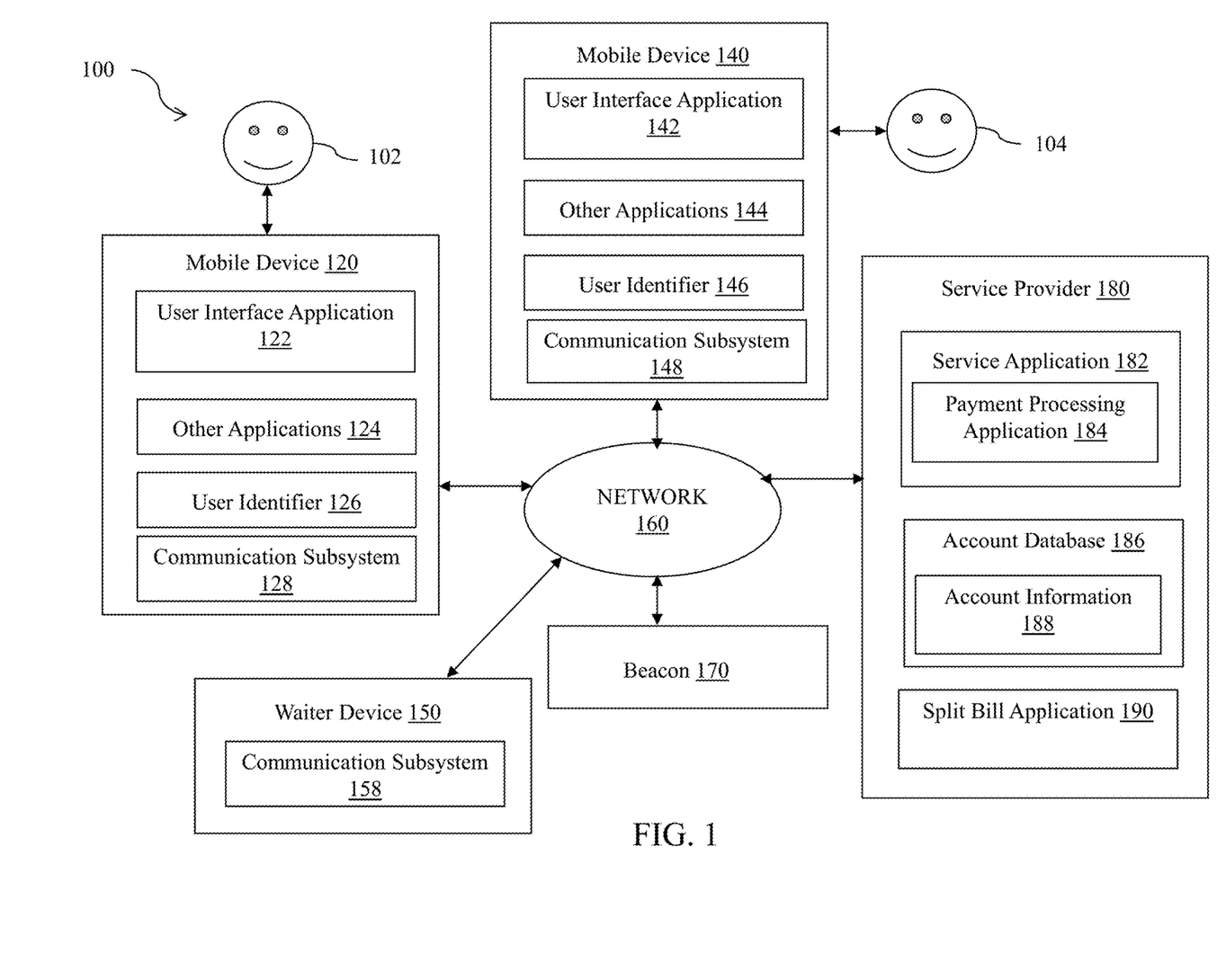
FIG. 1 is a block diagram illustrating a system for facilitating payment of a bill according to an embodiment of the present disclosure.

FIG. 1 shows one embodiment of a block diagram of a network-based system 100 adapted to facilitate payment of a bill over a network 160. As shown, system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

As shown in FIG. 1, the system 100 includes a first mobile device 120 (e.g., a smartphone), a second mobile device 140 (e.g., a smartphone), a waiter device 150 (e.g., a smartphone), a beacon 170 (e.g., a radio frequency beacon or Bluetooth Low Energy (BLE) beacon), and at least one service provider server or device 180 (e.g., network server device) in communication over the network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The first mobile device 120 and second mobile device 140, in one embodiment, may be utilized by first user 102 and second user 104 to interact with the service provider server 180 over the network 160. For example, users 102 and 104 may conduct financial transactions (e.g., account transfers) with the service provider server 180 and with each other via the mobile devices 120 and 140.

The first mobile device 120 and second mobile device 140, in various embodiments, may be implemented using any appropriate combination of hardware and/or software configured for wired and/or wireless communication over the network 160. The first mobile device 120, in one embodiment, may be utilized by the first user 102 to interact with the service provider server 180 over the network 160. The second mobile device 140, in turn, may be used by the second user 104 to interact with the service provider server 180. For example, the first user 102 may conduct financial transactions (e.g., account transfers) with the service provider server 180 via the mobile device 120. In various implementations, the first mobile device 120 may include a wireless telephone (e.g., cellular or mobile phone), a tablet, a wearable computing device, a personal computer, a notebook computer, and/or various other generally known types of wired and/or wireless computing devices.

The first mobile device 120, in one embodiment, includes a user interface application 122, which may be utilized by the first user 102 to conduct transactions (e.g., shopping, purchasing, bidding, payment, etc.) with the second user device 140, waiter device 150, beacon 170, or with the service provider server 180 over the network 160. In one aspect, purchase expenses may be directly and/or automatically debited from an account related to the first user 102 via the user interface application 122.

In one implementation, the user interface application 122 comprises a software program, such as a graphical user interface (GUI), executable by a processor that is configured to interface and communicate with the service provider server 180 via the network 160. In another implementation, the user interface application 122 comprises a browser module that provides a network interface to browse information available over the network 160. For example, the user interface application 122 may be implemented, in part, as a web browser to view information available over the network 160.

The first mobile device 120, in various embodiments, may include other applications 124 as may be desired in one or more embodiments of the present disclosure to provide additional features available to the first user 102. In one example, such other applications 124 may include security applications for implementing client-side security features, programmatic client applications for interfacing with appropriate application programming interfaces (APIs) over the network 160, and/or various other types of generally known programs and/or software applications. In still other examples, the other applications 124 may interface with the user interface application 122 for improved efficiency and convenience.

In various implementations, a user profile may be created using data and information obtained from cell phone activity over the network 160. Cell phone activity transactions may be used by the service provider server 180 to create at least one user profile for the first user 102 based on activity from the first mobile device 120 (e.g., cell phone), and for the second user 104 based on activity from the second mobile device 140. The user profile may be updated with each financial and/or information transaction (e.g., payment transaction, purchase transaction, etc.) achieved through use of the mobile devices 120 and 140. In various aspects, this may include the type of transaction and/or the location information from the mobile devices 120 and 140. As such, the profile may be used for recognizing patterns of potential fraud, setting transaction limits on the user, etc.

The first mobile device 120, in one embodiment, may include at least one user identifier 126, which may be implemented, for example, as operating system registry entries, cookies associated with the user interface application 122, identifiers associated with hardware of the first mobile device 120, or various other appropriate identifiers. The user identifier 126 may include one or more attributes related to the first user 102, such as personal information related to the first user 102 (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the user identifier 126 may be passed with a user login request to the service provider server 180 via the network 160, and the user identifier 126 may be used by the service provider server 180 to associate the first user 102 with a particular user account maintained by the service provider server 180.

Second mobile device 140 may have similar applications and modules as first mobile device 120. Second mobile device 140 may also include a user interface application 142 and one or more other applications 144 which may be used, for example, to provide a convenient interface to permit second user 104 to browse information over network 160. For example, in one embodiment, user interface application 142 may be implemented as a web browser configured to view information available over the Internet and communicate with service provider server 180.

Second mobile device 140 may further include other applications 144 such as security applications for implementing client-side security features, programmatic client applications for interfacing with appropriate application programming interfaces (APIs) over network 160, or other types of applications. Applications 144 may also include email, text, IM, and voice applications that allow second user 104 to communicate through network 160, receive messages from first user 102, and create and manage funding sources. Second mobile device 140 includes one or more user identifiers 146 which may be implemented, for example, as operating system registry entries, cookies associated with user interface application 142, identifiers associated with hardware of second mobile device 140, or other appropriate identifiers, such as used for payment/recipient/device authentication, e.g., the phone number associated with second mobile device 140. Identifiers may be used by a service provider to associate second user 104 with a particular account maintained by the service provider.

In some embodiments, the mobile devices 120 and 140 each include a communication subsystem 128 and 148, which can include radio frequency receivers and transmitters and/or optical (e.g., infrared) receivers and transmitters. The specific design and implementation of the communication subsystems 128 and 148 can depend on the communication network over which the mobile devices 120 and 140 are intended to operate. For example, the mobile devices 120 and 140 can include communication subsystems designed to operate over a Global System for Mobile Communication (GSM) network, a General Packet Radio Service (GPRS) network, an Enhanced Data Rates for Global Evolution (EDGE) network, a Wi-Fi or WiMax network, an LTE Direct network, and a Bluetooth™ network.

First mobile device 120 and second mobile device 140, in one embodiment, each include a geo-location component adapted to monitor and provide an instant geographical location (i.e., geo-location) of the devices 120 and 140. In one implementation, the geo-location of the devices 120 and 140 may include global positioning system (GPS) coordinates, zip-code information, area-code information, street address information, and/or various other generally known types of geo-location information. In one example, the geo-location information may be directly entered into the devices 120 and 140 by a user via a user input component, such as a keyboard, touch display, and/or voice recognition microphone. In another example, the geo-location information may be automatically obtained and/or provided by the devices 120 and 140 via an internal or external GPS monitoring component. In other embodiments, the geo-location can be automatically obtained without the use of GPS. In some instances, cell signals or wireless signals are used. This helps to save battery life and to allow for better indoor location where GPS typically does not work.

In one aspect, the first user 102 and second user 104 may elect to provide or may be prompted to provide permission for the release of geo-location information. Accordingly, the first user 102 and second user 104 may have exclusive authority to allow transmission of geo-location information from the mobile devices 120 and 140 to the service provider server 180. In any instance, the service provider server 180 may communicate with the mobile devices 120 and 140 via the network 160 and request permission to acquire geo-location information from the mobile devices 120 and 140 for geo-location based commerce.

One or more waiter devices 150 may be configured like the mobile devices 120 and 140. The waiter device 150 is used by a wait person to receive voice orders from users 102 and 104. As such, the waiter device 150 may include a voice sensor (e.g., microphone) to capture the voice or other sounds made by the users 102 and 104. Once the order is received, the waiter device 150 can forward the voice order to a restaurant device or server (not shown) to process the order and/or to the service provider server 180. The waiter device 150 can also transmit a bill to the mobile devices 120 and 140.

In various embodiments, like mobile devices 120 and 140, waiter device 150 also includes a communication subsystem 158, which can include radio frequency receivers and transmitters and/or optical (e.g., infrared) receivers and transmitters. Accordingly, the waiter device 150 can include a communication subsystem designed to operate over a Global System for Mobile Communication (GSM) network, a General Packet Radio Service (GPRS) network, an Enhanced Data Rates for Global Evolution (EDGE) network, a Wi-Fi or WiMax network, an LTE Direct network, and a Bluetooth™ network.

Waiter device 150, in one embodiment, also includes a geo-location component adapted to monitor and provide an instant geographical location (i.e., geo-location) of the waiter device 150. In one implementation, the geo-location of the waiter device 150 may include global positioning system (GPS) coordinates, zip-code information, area-code information, street address information, and/or various other generally known types of geo-location information. The geo-location information may be directly entered into the waiter device 150 by a user via a user input component, such as a keyboard, touch display, and/or voice recognition microphone or the geo-location information may be automatically obtained and/or provided by the waiter device 150 via an internal or external GPS monitoring component. In other embodiments, the geo-location can be automatically obtained without the use of GPS. In some instances, cell signals or wireless signals are used. This helps to save battery life and to allow for better indoor location where GPS typically does not work.

Beacon 170 may be a hardware device including sensors that is separate from a user device and transportable, or it can be a user device that includes Bluetooth technology. To prevent theft of beacons in cases where the beacon 170 is transportable, the beacon 170 may be "locked down" such that it would not function if moved to another location without secure configuration changes. Beacon 170 may be set up by merchants or individuals offering various items, such as products and/or services for sale. As defined herein, a "beacon" is a short range communication device having a known or fixed location that provides a signal that can be detected by mobile devices within a certain proximity of the beacon. An example of a beacon is a radio frequency (RF) beacon (e.g., Bluetooth™ low energy (BLE) beacon), infrared beacon or a radio frequency identifier (RFID) tag. For example, a BLE beacon can broadcast an RF signal that includes its position coordinates (e.g., latitude, longitude), which can be detected by a mobile device. In some implementations, the beacon can also advertise location based services provided by a beacon network. A beacon network encompasses a plurality of beacons in a geographic region.

Beacon 170 is typically maintained by one or more service providers. When users 102 and 104 come in range of beacon 170, a mobile application on the mobile devices 120 and 140 run by a service provider can wake up and connect to the beacon 170. Similarly, when waiter device 150 comes within range of beacon 170, the waiter device 150 can connect to the beacon 170. Mobile devices 120 and 140 and waiter device 150 can then receive messages from beacon 170, and beacon 170 can receive messages from the mobile devices 120 and 140 and waiter device 150. In some implementations, beacon 170 is a BLE beacon. Beacon 170 can transmit customized messages to the mobile devices 120 and 140 and waiter device 170 based on the location of the mobile devices 120 and 140 and waiter device 150.

Beacon 170 can output a wireless signal that can be detected by mobile devices 120 and 140 and waiter device 150 when the devices are within a certain proximity of the beacon 170. Beacon 170 may be a device that periodically or continuously transmits a signal, such as a short-distance wireless (e.g., BLE), medium distance wireless (e.g., Wi-Fi), and/or other electro, magnetic, and/or electro-magnetic transmissions. Power on beacon 170 can be adjusted to communicate only within a desired range, which may depend on intended message ranges. Mobile devices 120 and 140 and waiter device 150 are configured to detect the transmitted signals from beacon 170, such that when mobile devices 120 and 140 are located within the transmission range of beacon 170, the signal may be detected.

The service provider server 180, in one embodiment, may be maintained by a transaction processing entity or an online service provider, which may provide processing for financial transactions and/or information transactions between the first user 102, the second user 104, waiter device 150, and beacon 170. As such, the service provider server 180 includes a service application 182, which may be adapted to interact with the mobile devices 120 and 140, waiter device 150 and/or beacon 170 over the network 160 to facilitate the searching, selection, purchase, and/or payment of items by the users 102 and 104. In one example, the service provider server 180 may be provided by PayPal®, Inc., eBay® of San Jose, Calif., USA, and/or one or more financial institutions or a respective intermediary that may provide multiple point of sale devices at various locations to facilitate transaction routings between merchants and, for example, financial institutions.

The service application 182, in one embodiment, utilizes a payment processing application 184 to process purchases and/or payments for financial transactions between the users 102 and 104 and the waiter device 150. In one implementation, the payment processing application 184 assists with resolving financial transactions through validation, delivery, and settlement. As such, the service application 182 in conjunction with the payment processing module 184 settles indebtedness between the users 102 and 104 and the waiter device 150, wherein accounts may be directly and/or automatically debited and/or credited of monetary funds in a manner as accepted by the banking industry.

The service provider server 180, in one embodiment, may be configured to maintain one or more user accounts and merchant accounts in an account database 186, each of which may include account information 188 associated with one or more individual users (e.g., first user 102 and second user 104) and merchants (e.g., one or more merchants associated with the waiter device 150). For example, account information 188 may include private financial information of users 102 and 104 and each merchant associated with the one or more waiter devices 150, such as one or more account numbers, passwords, credit card information, banking information, or other types of financial information, which may be used to facilitate financial transactions between first user 102, second user 104, and the merchant associated with the waiter devices 150. In various aspects, the methods and systems described herein may be modified to accommodate users and/or merchants that may or may not be associated with at least one existing user account and/or merchant account, respectively.

In one implementation, the users 102 and 104 may have identity attributes stored with the service provider server 180, and users 102 and 104 may have credentials to authenticate or verify identity with the service provider server 180. User attributes may include personal information, banking information and/or funding sources. In various aspects, the user attributes may be passed to the service provider server 180 as part of a login, search, selection, purchase, and/or payment request, and the user attributes may be utilized by the service provider server 180 to associate users 102 and 104 with one or more particular user accounts maintained by the service provider server 180.

In various embodiments, the service provider server 180 also includes a split bill application 190 that splits the bill between users (e.g. users 102 and 104). The split bill application 190 associates specific orders with specific users, determines how to split a bill among users at a table, and determines who to send the bill to. In certain embodiments, the split bill application 190 identifies the user who made the specific order by identifying the user's voice.

Figure 2:
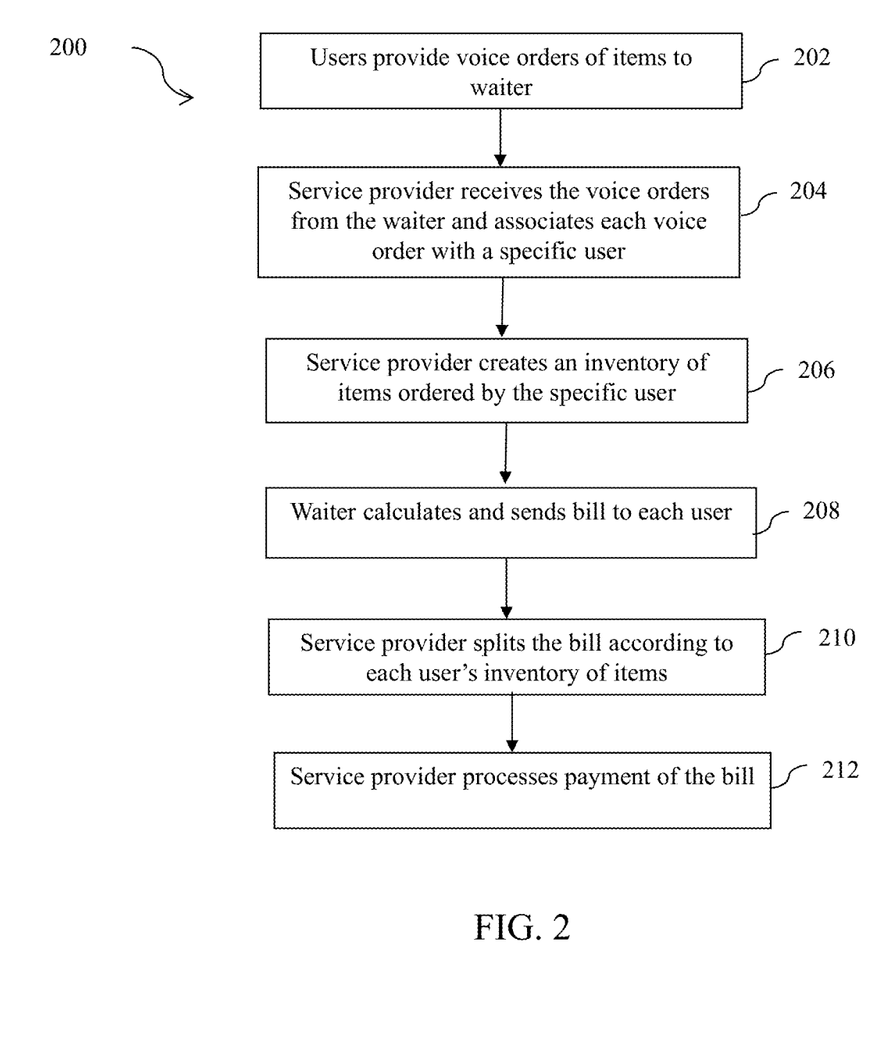
FIG. 2 is a flowchart showing a method for facilitating payment of a bill according to an embodiment of the present disclosure.

Referring now to FIG. 2, a flowchart of a method 200 for facilitating payment of a bill is illustrated according to an embodiment of the present disclosure. In various embodiments, the users 102 and 104 each register with a service provider, which runs a mobile application. Registration may include signing up for the service and agreeing to any terms required by the service provider, such as through a user device. In one embodiment, the user device is a mobile computing device, such as a smart phone, a PC, or a computing tablet. In other embodiments, registration may be done completely through the user device, partially through the user device, or without using the user device, such as through a phone call or in-person visit to a representative of the payment service provider.

The user may be requested to provider specific information for registration, such as, but not limited to, a name, address, phone number, email address, picture, a user name for the account, and a password or PIN for the account. The type of information may depend on whether the user already has an account with the service provider. Requested information may be entered through the user device or other means, including voice or manual key entry. Once all the requested information is received and confirmed, the service provider may create an account for the user.

First user 102 and second user 104 go out to a restaurant and are seated together at a table. It should be understood that although only two users are described as dining out together, larger parties, such as 10 or more people may constitute a party at a table.

A waiter or waitress carrying a waiter device 150 that is running a service provider application then approaches the table. The service provider determines the location of the waiter device 150 by determining which table the waiter device 150 is visiting. In various embodiments, each table is designated by RFID, beacon (e.g., beacon 170), or a general location within a restaurant. For example, the table may be associated with specific coordinates entered by a restaurant proprietor prior to opening the restaurant for business. When the waiter device 150 visits the table, the specific table may be selected in a variety of ways. For instance, the waiter device 150 may make a connection to the beacon 170 so that the service provider server 180 knows the location of the waiter device 150. In another example, if the waiter device 150 is not a smart device, communication between the wait person's own personal smart device and the waiter device 150 provides the location of the waiter device 150. In yet another example, the waiter device 150 may display all the tables associated with the restaurant, and the waiter selects one table from the display.

In some embodiments, the location of the users 102 and 104 is also determined by the service provider by determining which table the users 102 and 104 are seated at. For example, the mobile devices 120 and 140 may connect with the beacon 170 at the table, or the mobile devices 120 and 140 may release geo-location information to the service provider server 180.

Once the table is selected and the waiter is known to be at the specific table location, the service provider application on the waiter device 150 goes into listening mode. Similarly, the mobile devices 120 and 140 are activated and also go into listening mode.

In some embodiments, the waiter device 150 makes a connection with each of the mobile devices 120 and 140 when the first user 102 and the second user 104 are seated. The proximity of the waiter device 150, the first mobile device 120, and the second mobile device 140 allows the three devices to communicate through the beacon 170 or the restaurant's Wi-Fi. All three devices initially connect and periodically reconnect when orders are made until the bill is paid or the users 102 and 104 leave the restaurant.

At step 202, the first user 102 and second user 104 order food items off a menu. The users 102 and 104 each verbally state what their order is. For example, first user 102 says, "I'll have the steak, french fries, and Caesar salad," and the second user 104 states, "I'll have the salmon, spinach, and mushroom soup." The waiter device 150, first mobile device 120, and second mobile device 140 each receive the voice orders.

In certain embodiments, the mobile devices 120 and 140 send the voice orders to service provider server 180 for identification of the users making the order. In other embodiments, the waiter device 150 sends the voice orders to the service provider server 180.

At step 204, the service provider server 180 receives the voice orders and associates the orders with the users 102 and 104. In some embodiments, by virtue of the users 102 and 104 using voice applications on their mobile devices 120 and 140, the service provider server 180 can understand which user is ordering through voice verification.

Voice verification or voice authentication may be used to associate specific orders with specific users. Voice authentication seeks to identify the speaker based solely on the spoken utterance. A speaker's identity can be verified using feature extraction and pattern matching algorithms, wherein pattern matching is performed between features of an incoming voice sample and those of previously stored reference samples. The voice sample from a user is compared with a reference sample to verify an identity of the user. Features used for speech processing involve, for example, pitch frequency, power spectrum values, spectrum coefficients, and linear predictive coding.

In various embodiments, users 102 and 104 are prompted for a voice sample during registration with the service provider. The voice of the users 102 and 104 are recorded to create a voice scan or profile, which is then stored. The voice profile, in certain embodiments, includes more than one phrase spoken by the user for added security as well as to allow identity verification by comparing alternate phrases, such as by prompting the user to speak an additional phrase if the identity of the user is not verified with a first phrase.

In some embodiments, the service provider server 180 may interface with voice-enabled intelligent personal assistant systems such as Siri® or Google Now® to obtain a reference voice sample for users 102 and 104. In other embodiments, the service provider server 180 may integrate voice commands into its mobile application and get voice samples for users 102 and 104. Once reference voice samples are acquired, they may be stored on user devices, on a service provider database, or on a third party database.

Once each user voice at the table is identified, the first mobile device 120 affirms that the first user 102 is speaking and making an order for steak, french fries and salad, and the second mobile device 140 affirms that the second user 104 is speaking and making an order for salmon, spinach, and soup. The first mobile device 120 and second mobile device 140 then confirm these orders with the waiter device 150. That is, the first mobile device 120 communicates to the waiter device 150 that the first user 102 has ordered steak, french fries, and salad, and the second mobile device 140 communicates to the waiter device 150 that the second user 104 has ordered salmon, spinach, and soup.

In some embodiments, instead of the mobile devices 120 and 140 confirming the voice orders with the waiter device 150, the mobile devices 120 and 140 can send voice profiles of the first user 102 and second user 104 to the waiter device 150. For example, when the waiter device 150 receives the voice orders, the mobile devices 120 and 140 may send the voice profiles of the users to the waiter device 150. The waiter device 150 can then use the voice profiles to identify which user is ordering what. For instance, the waiter device 150 may compare the received voice profiles with stored voice profiles of past customers.

In certain aspects, the mobile devices 120 and 140 can determine whether first user 102 is ordering or second user 140 is ordering by determining whose voice is the loudest at the table. For example, each mobile device may be equipped with a voice sensor or microphone to capture sounds made by the users at the table. The mobile devices at the table then "talk" amongst each other to determine which mobile device captured the loudest voice. When the loudest voice is identified, the mobile device associated with the loudest voice can communicate to the waiter device 150 that this specific user (e.g., first user 102) is making the order.

In some embodiments, the waiter device 150 includes smart glasses such as Google Glass®. The wait person looks at the person at the table speaking and making the order. The waiter device 150 is able to determine which person is ordering by, for example, image recognition.

Once each order at the table is associated with a user, at step 206, the waiter device 150 transmits this information to the service provider, and the service provider server 180 creates an inventory of items ordered by the specific user and/or the table as a whole. In other words, a specific order is placed on a specific user's account. For example, the steak, french fries, and salad are placed on a list for first user 102, and salmon, spinach, and soup are placed on a list for second user 104. In this way, the service provider keeps track of what each user ordered so that each user knows exactly what they ordered and how much of the bill they need to pay.

In some aspects, the items ordered are displayed on each mobile device 120 and 140 so that the users 102 and 104 can verify their order. A list showing the ordered items, cost for each ordered item, and a total amount due on an order may be displayed on mobile devices 120 and 140. This works to prevent incorrect orders that need to be sent back and unnecessary delays.

When the users 102 and 104 are finished with their meal, they can request the bill. For example, they can communicate to a wait person that they are ready to pay for the bill. At step 208, the waiter device 150 calculates the bill for the entire table and sends the bill to each mobile device at the table. In various embodiments, each user (e.g., first user 102 and second user 104) is provided with a display on their mobile device where they can see the cost of each item, the cost of all items ordered by them, as well as the cost of the entire check.

When each user is ready to pay, at step 210, the service provider server 180 splits the bill according to the items ordered by each user so that each user pays for only what they ordered. So first user 102 is presented with a bill for the steak, french fries, and salad, and second user 104 is presented with a bill for the salmon, spinach, and soup.

In some embodiments, the users at the table may want the bill split in a way different than based on what they ordered. For example, the users can identify specific portions of a check that they want to pay for, or can agree to split the bill equally among everyone. This option may be available on their mobile device so that payment is calculated by dividing the total of the check by a certain number of people. In another instance, the users at the table may decide to pay for one of the users because of a special occasion (e.g., graduation or birthday). In this case, each user can indicate on their phone the extra amount they wish to pay. In yet another example, a group of friends may take turns paying for the bill, and it may be the turn of one of the users to pay for the entire bill. This user can specify on his or her mobile device that he or she is paying the whole check.

In various embodiments, the service provider server 180 identifies who in the party the bill should be sent to. This can be based on past interactions between the members in the party, age of the members in the party, relationships between the members in the party, and the context that the members of the party are in. By "context" is meant the surroundings and environment of the user, including, but not limited to, time, location, social environment, or combinations thereof. For example, if the party includes an adult and a group of teenagers, the service provider may send the bill to the adult because it is inferred that he or she is the parent. In another example, the service provider determines that the party includes a male and female who are out on a date. The service provider sends the bill to the male. In yet another example, the service provider determines it is Father's Day, and sends the check to the oldest female in the party.

In some aspects, the service provider server 180 identifies subgroups within the party at the table and splits the bill according to the subgroup. If the members or a member in the subgroup decides that they do not want the bill split based on the subgroup, the member(s) can specify on their mobile device what portion or how much of the bill they want to pay. The present disclosure allows a table to decide to pay individually, as a group, as a subgroup, or any variation thereof.

The subgroup is a group within the party that usually pay together or that are likely to want to pay together. The members in the subgroup typically have some kind of relationship. A subgroup can be a family, a married couple, a dating couple, an older family member and a younger family member, a group of friends, etc.

Subgroups can be identified based on past interactions and/or transactions; social network relationships; subaccounts in an account with the service provider; and/or context. For example, the service provider can determine that first user 102 and second user 104 have dined out together before, and that first user 102 usually pays for the meal. Based on this information, the service provider combines the cost of the items ordered by first user 102 and second user 104 into a single bill, communicates this cost to the first user 102, and deducts this cost from the bill for the whole table. Subgroups can also be determined by using social networks. For instance, the service provider may determine whether or not the first user 102 and the second user 104 are connected by a social network such as Facebook, Twitter, Instagram, Pinterest, Flickr, etc. If the users 102 and 104 are directly connected, the service provider can determine if they are family and what relationship they have (e.g., parent/child, siblings, cousins, uncle or aunt/nephew or niece, grandparent/grandchild, etc.). In various embodiments, the service provider can also determine the relative ages of the users 102 and 104 to decide who to send the check to. The service provider server 180 can also determine whether users in the party are linked together by a service provider account. For example, first user 102 may have an account with the service provider, and the first user 102 specified a subaccount within the account that second user 104 has access to. Based on this information, the service provider groups the costs associated with first user 102 and second user 104 together, and sends the bill to the first user 102. The service provider server 180 may also determine who to group together based on calendar events or context. For example, a user's calendar may indicate a friend's birthday, graduation, anniversary, or holiday (e.g., Mother's Day, Father's Day, etc.). If a date falls on a birthday, for instance, the service provider may exclude the birthday celebrant from the bill, group the other people in the party, and divide the bill amongst the group.

In a specific example, the party at a table may be celebrating a wedding anniversary. Due to the special circumstances, everyone in the party has agreed to pay for their own meals, as well as an equal portion of the anniversary couple's meal. Also, there happens to be a few married couples that want to combine the cost of their meals into one payment. The service provider groups the married couples into subgroups so that the costs of each couple's meal is combined on one bill. Moreover, the service provider takes the cost of the anniversary couple's meal and divides it among the rest of the party (e.g., individuals and subgroups). For example, assume there are 7 people left in the party after removing the anniversary couple. Four of the people are married couples, and the 3 remaining people are single. If the cost of the anniversary couple's meal is $100, then each married couple would pay about $28.50, and each single person would pay about $14.25 for the anniversary couple's meal.

At step 212, the service provider server 180 processes payment of the bill. The bill is paid in the way specified by the users at the table. In various embodiments, each user or group of users share of the bill is deducted from their respective service provider accounts and transferred to an account of the restaurant.

A restaurant's ability to allows diners to efficiently split their bill avoids the arduous and often awkward or embarrassing task of each diner trying to manually calculate what they owe from a printed or handwritten bill that may be difficult to understand. The present disclosure allows each diner to determine exactly how much they need to contribute to the total outstanding bill and provides each diner flexibility on how much of the bill they want to pay. The present disclosure is also beneficial to business diners that require a receipt stating only their portion of the bill and exactly what they paid for.

Figure 3:
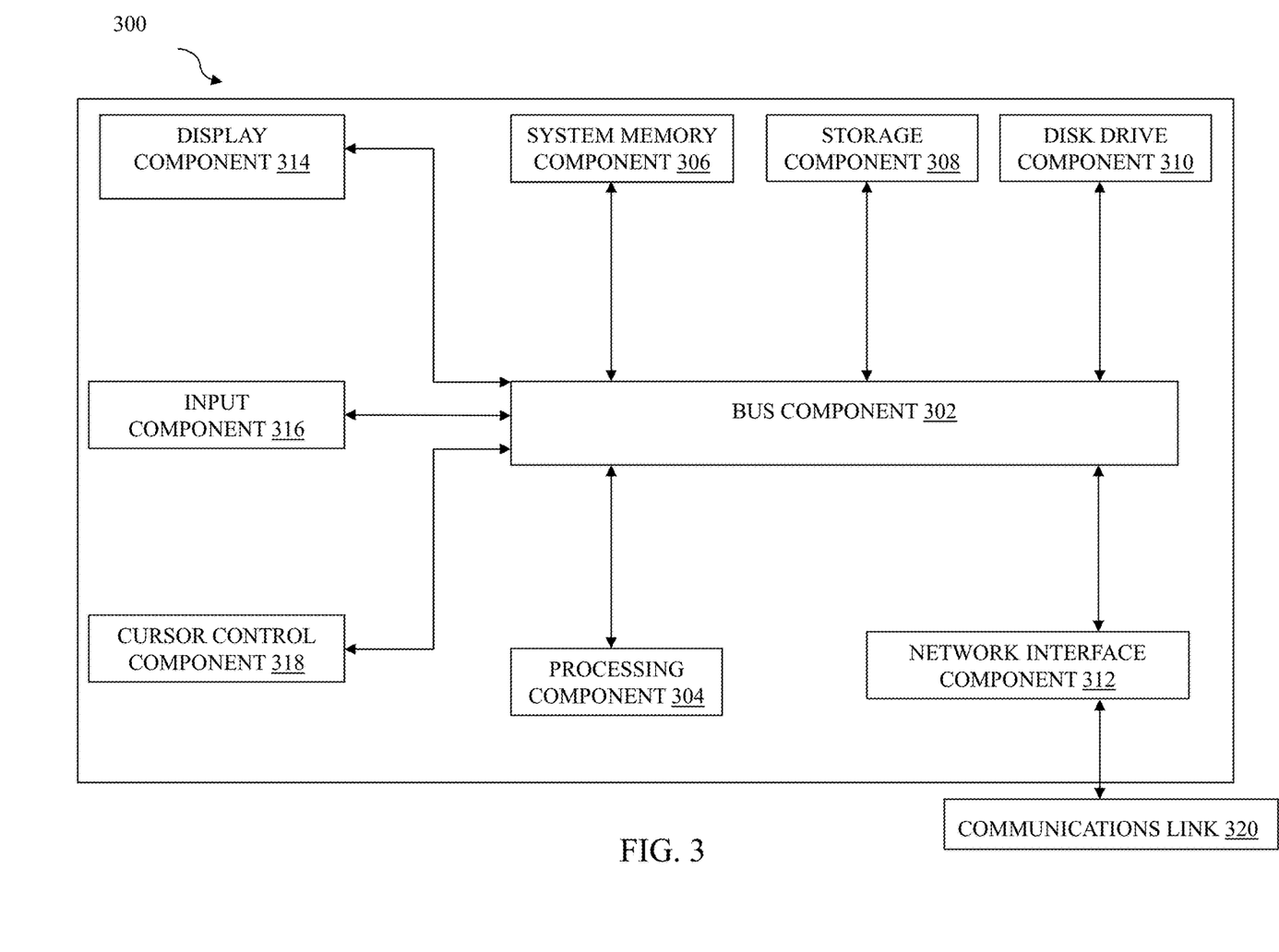
FIG. 3 is a block diagram of a system for implementing one or more components in FIG. 1 according to an embodiment of the present disclosure.

Referring now to FIG. 3, a block diagram of a system 300 is illustrated suitable for implementing embodiments of the present disclosure, including mobile devices 120 and 140, waiter device 150, beacon 170, and service provider server or device 180. System 300, such as part of a cell phone, a tablet, a personal computer and/or a network server, includes a bus 302 or other communication mechanism for communicating information, which interconnects subsystems and components, including one or more of a processing component 304 (e.g., processor, micro-controller, digital signal processor (DSP), etc.), a system memory component 306 (e.g., RAM), a static storage component 308 (e.g., ROM), a network interface component 312, a display component 314 (or alternatively, an interface to an external display), an input component 316 (e.g., keypad or keyboard), and a cursor control component 318 (e.g., a mouse pad).

In accordance with embodiments of the present disclosure, system 300 performs specific operations by processor 304 executing one or more sequences of one or more instructions contained in system memory component 306. Such instructions may be read into system memory component 306 from another computer readable medium, such as static storage component 308. These may include instructions to process financial transactions, make payments, etc. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 304 for execution. Such a medium may take many forms, including but not limited to, non-volatile media, volatile media, and transmission media. In various implementations, volatile media includes dynamic memory, such as system memory component 306, and transmission media includes coaxial cables, copper wire, and fiber optics, including wires that comprise bus 302. Memory may be used to store visual representations of the different options for searching, auto-synchronizing, making payments or conducting financial transactions. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 300. In various other embodiments, a plurality of systems 300 coupled by communication link 320 (e.g., network 160 of FIG. 1, LAN, WLAN, PTSN, or various other wired or wireless networks) may perform instruction sequences to practice the disclosure in coordination with one another. Computer system 300 may transmit and receive messages, data, information and instructions, including one or more programs (i.e., application code) through communication link 320 and communication interface 312. Received program code may be executed by processor 304 as received and/or stored in disk drive component 310 or some other non-volatile storage component for execution.

Although various components and steps have been described herein as being associated with mobile devices 120 and 140, waiter device 150, beacon 170, and service provider server 180 of FIG. 1, it is contemplated that the various aspects of such servers illustrated in FIG. 1 may be distributed among a plurality of servers, devices, and/or other entities.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
   a wireless beacon;
   a non-transitory memory; and
   one or more hardware processors coupled to the non-transitory memory and configured to read instructions from the non-transitory memory to cause the system to perform operations comprising:
   receiving first beacon data from the wireless beacon, wherein the wireless beacon is associated with a table;
   determining, from the first beacon data, that a waiter device is communicatively connected to the wireless beacon and is located within a first distance to the table;
   receiving, in response to determining that the waiter device is located within the first distance to the table, second beacon data from the wireless beacon;
   determining, from the second beacon data, that a plurality of user devices are located within a second distance to the table and a location of each of the user devices relative to at least another one of the user devices;
   receiving first waiter data from the waiter device, wherein the first waiter data comprises purchase data and visual image data from one or more photographs of users of the user devices as the waiter device receives one or more purchase orders from the users;
   determining, from the first waiter data, an indication of a plurality of purchased items associated with the table;
   determining, for each of the purchased items and based on the visual image data, an identity of a user purchasing the item;
   associating, based on the location of each of the user devices determined using the second beacon data from the wireless beacon and the identities of the users purchasing the items, the purchased items with respective accounts corresponding to the identities of the users of the plurality of user devices;
   assigning a portion of a total bill amount to each of the respective accounts based on the purchased items associated with the respective accounts; and
   processing a payment for each of the respective accounts according to the assigned portion.

2. The system of claim 1, wherein the purchased items are orders at a restaurant; and wherein associating the purchased items with respective accounts comprises associating each of the purchased items with a user device.

3. The system of claim 1, wherein the processing the payment for each of the respective accounts includes debiting a first account of the respective accounts and sending information to the first account that is usable by the first account for requesting payments from others of the respective accounts in accordance with the assigned portions of the total bill amount.

4. The system of claim 1, wherein the first waiter data comprises a voice profile received from at least one of the user devices.

5. The system of claim 4, wherein the associating the purchased items with respective accounts is further based on the voice profile.

6. The system of claim 1, wherein the operations further comprise:
   determining payment subgroups from the respective accounts; and
   identifying a particular account for each payment subgroup for processing the payment.

7. The system of claim 6, wherein the determining the payment subgroups comprises analyzing past transactions and interactions between the user devices.

8. The system of claim 1, wherein the operations further comprise identifying whether social network relationships exist between each user of each of the plurality of user devices.

9. The system of claim 1, wherein the operations further comprise determining, using social media, whether there is a familial relationship between each user of each of the plurality of user devices.

10. A method for facilitating payment of a bill, the method comprising:
- detecting, using a wireless beacon, that a waiter device is communicatively connected to the wireless beacon and is located within a first distance to a table associated with the wireless beacon;
- detecting, using the wireless beacon and in response to the detecting that the waiter device is located within the first distance to the table, that a plurality of user devices are located within a second distance to the table;
- determining, based on waiter data received from the waiter device, an indication of a plurality of purchased items associated with the table;
- determining, for each of the purchased items and based on a visual component of the waiter data, an identity of a user purchasing the item, wherein the visual component comprises one or more digital images of users of the user devices associated with the waiter device receiving one or more purchase orders from the users;
- associating, based on the determinations of the identities of the users purchasing the items, the purchased items with respective accounts corresponding to the identities of the users;
- assigning a portion of a total bill amount to each of the respective accounts based on the purchased items associated with the respective accounts; and
- processing a payment for each of the respective accounts according to the assigned portion.

11. The method of claim 10, wherein the purchased items are orders at a restaurant; and wherein associating the purchased items with respective accounts comprises associating each of the purchased items with a user device.

12. The method of claim 10, wherein the processing the payment for each of the respective accounts includes debiting a first account of the respective accounts and sending information to the first account that is usable by the first account for requesting payments from others of the respective accounts in accordance with the assigned portions of the total bill amount.

13. The method of claim 10, wherein the waiter data comprises a voice profile received from at least one of the user devices.

14. The method of claim 13, wherein the associating the purchased items with respective accounts is further based on the voice profile.

15. The method of claim 10, further comprising
- determining payment subgroups from the respective accounts; and
- identifying a particular account for each payment subgroup for processing the payment.

16. The method of claim 15, wherein the determining the payment subgroups comprises analyzing past transactions and interactions between the user devices.

17. A non-transitory machine-readable medium having stored thereon machine-readable instructions executable to cause a machine to perform operations comprising:
- receiving first beacon data from a wireless beacon;
- determining, from the first beacon data, that a waiter device is communicatively coupled to the wireless beacon;
- receiving, in response to determining that the waiter device is communicatively coupled to the wireless beacon, second beacon data from the wireless beacon;
- determining, from the second beacon data, that a plurality of user devices are located within a first distance to the wireless beacon;
- receiving visual image data and an indication of a plurality of purchased items from the waiter device, wherein the visual image data comprises one or more photographs of users of the user devices as the waiter device receives one or more purchase orders from the users;
- determining, for each of the purchased items and based on the visual image data, an identity of a user purchasing the item;
- associating, based on the determinations of the users purchasing the items, the purchased items with respective accounts of the identities of the users;
- assigning a portion of a total bill amount to each of the respective accounts based on the purchased items associated with the respective accounts; and
- processing a payment for each of the respective accounts according to the assigned portion.

18. The non-transitory machine-readable medium of claim 17, wherein the purchased items are orders at a restaurant; and wherein associating the purchased items with respective accounts comprises associating each of the purchased items with a user device.

19. The non-transitory machine-readable medium of claim 17, wherein the processing the payment for each of the respective accounts includes debiting a first account of the respective accounts and sending information to the first account that is usable by the first account for requesting payments from others of the respective accounts in accordance with the assigned portions of the total bill amount.

20. The non-transitory machine-readable medium of claim 17, wherein the operations further comprise:
- receiving a voice profile from at least one of the user devices.

* * * * *